United States Patent [19]
Alexander et al.

[11] Patent Number: 5,738,787
[45] Date of Patent: Apr. 14, 1998

[54] FILTER PAN

[75] Inventors: John Alexander, Valrico; William A. Marrone, Mulberry; Miguel A. DeJesus, Lakeland, all of Fla.

[73] Assignee: IMC-Agrico Company, Mulberry, Fla.

[21] Appl. No.: 550,528

[22] Filed: Oct. 30, 1995

[51] Int. Cl.$^6$ ............................................ B01D 39/10
[52] U.S. Cl. .................. 210/498; 210/506; 29/896.62; 427/241; 228/165
[58] Field of Search ........................ 228/165, 262.3, 228/262.31; 210/344, 498, 499, 500.1; 29/896.6, 896.62, 447; 427/241; 428/594

[56] References Cited

U.S. PATENT DOCUMENTS

| | | |
|---|---|---|
| 938,378 | 10/1909 | Grothe et al. |
| 2,317,449 | 4/1943 | Flock. |
| 3,080,063 | 3/1963 | Krynski et al. |
| 3,139,404 | 6/1964 | Stock. |
| 3,216,576 | 11/1965 | Roos. |
| 3,291,312 | 12/1966 | Peterson. |
| 3,387,711 | 6/1968 | Rickert. |
| 3,389,800 | 6/1968 | Roos. |
| 3,426,909 | 2/1969 | Garner. |
| 3,438,505 | 4/1969 | Luthi. |
| 3,966,610 | 6/1976 | Gibbs. |
| 3,966,611 | 6/1976 | Gibbs et al. |
| 4,391,706 | 7/1983 | Steinkraus. |
| 4,547,288 | 10/1985 | Little ............................ 210/344 |
| 4,655,920 | 4/1987 | Ragnegard. |
| 4,721,566 | 1/1988 | Chamberlain et al. |
| 5,399,265 | 3/1995 | Nehls ............................ 210/490 |

Primary Examiner—W. L. Walker
Attorney, Agent, or Firm—Foley & Lardner

[57] ABSTRACT

The present invention features a filtration plate for use in a filter pan comprising a corrugated sheet having a series of alternately upwardly and downwardly opening channels and a reinforcing material bonded to surfaces of the downwardly opening channels. The reinforcing material is effective for strengthening the sheet and retaining heat in a manner effective to slow cooling of the filtration plate during washing and to reduce heat losses from the filtration plate during filtering. According to a preferred aspect of the invention, the corrugated sheet is a monolithic sheet of structural metal having a smooth upper filtration surface. The invention also provides a filter pan configured for use in filtration of a filtrate from solid particles. The filter pan comprises a filtration plate including a corrugated, monolithic sheet of structural metal having a series of alternately upwardly and downwardly opening channels. The filtration plate has an upper filtration surface that is smooth and unbroken by welds or joints, and the upwardly opening channels thereof have a width effective for channeling liquid. The invention also provides a method for making a filtration plate for use in a filter pan, comprising the steps of stamping a sheet of a structural metal to form it into a corrugated sheet having a series of alternately upwardly and downwardly opening channels. The upwardly opening channels have a width effective for channeling a filtrate and the downwardly opening channels include a reinforcing material bonded thereto for strengthening the sheet. The reinforcing material is effective for retaining heat in a manner effective to slow cooling of the filtration plate during washing and for reducing heat losses from the filtration plate during filtering.

21 Claims, 5 Drawing Sheets

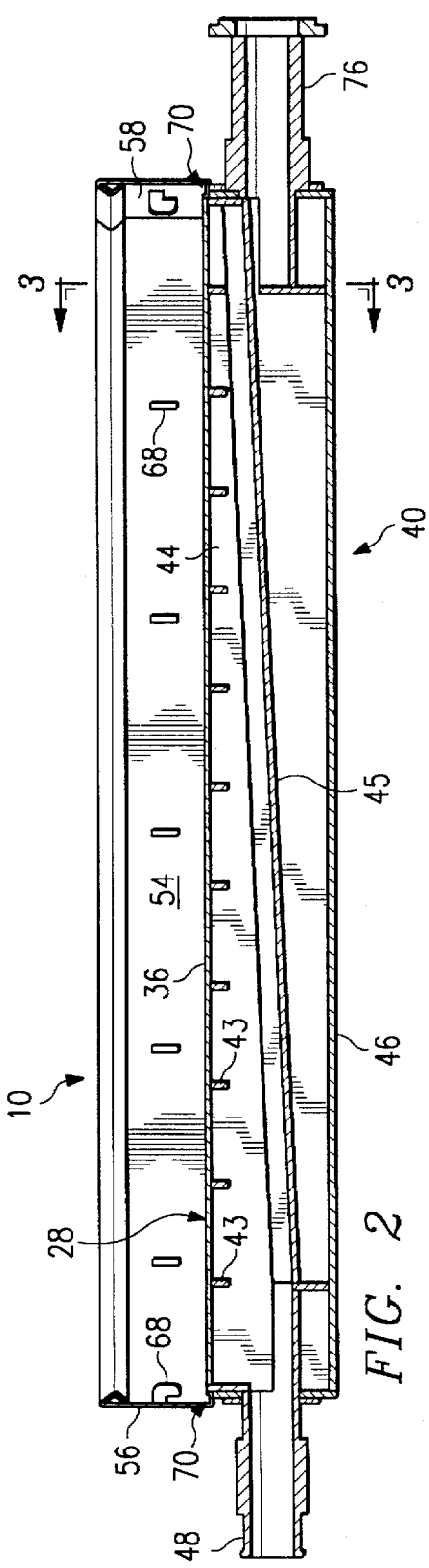
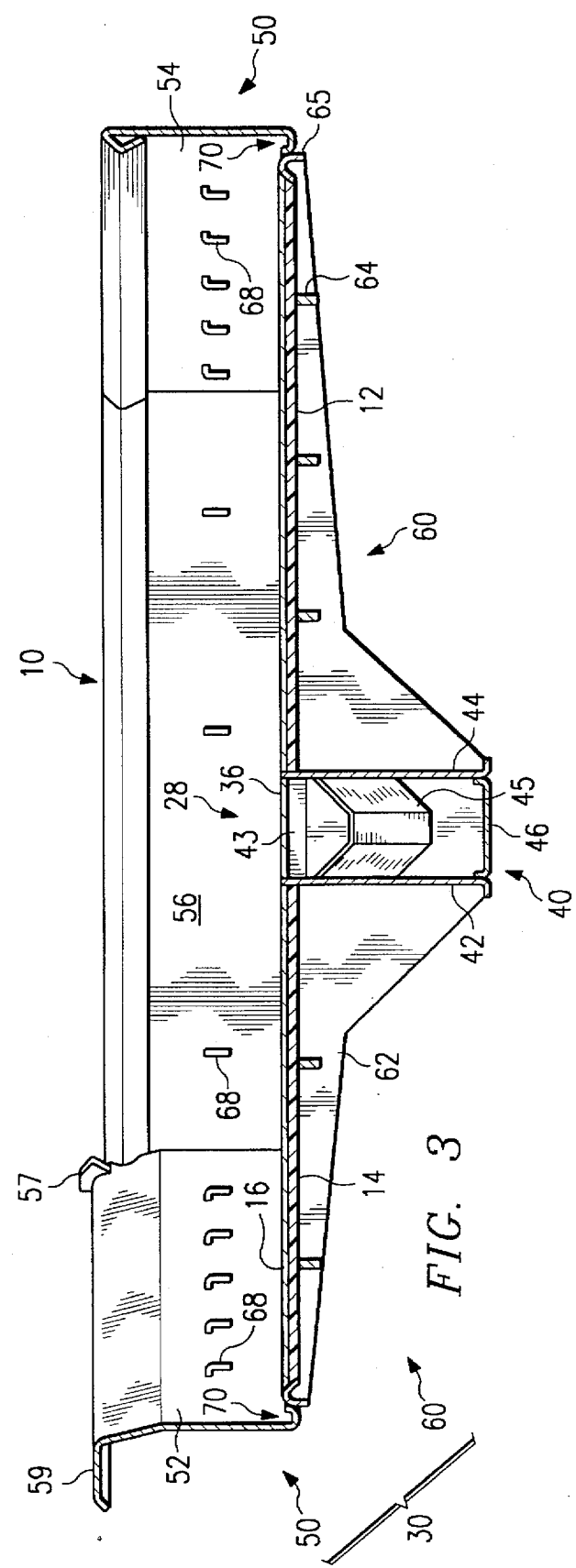

FILTER PAN

FIELD OF THE INVENTION

This invention relates to a filter pan used in the manufacture of various products such as phosphoric acid from phosphate ore.

BACKGROUND OF THE INVENTION

The manufacture of phosphoric acid from phosphate ore can be accomplished through a process known in the industry as the wet acid process. The wet acid process involves grinding and separating by size raw phosphate rock and then digesting the crushed rock with sulfuric acid to produce a slurry. The slurry consisting of phosphoric acid and gypsum is then fed to a filtration unit where phosphoric acid is separated from the gypsum solids. This separation of acid and solids is accomplished by filtering the slurry through a rotary pan filter while applying a partial vacuum to the underside of the filter.

It is known in the art to perform this wet acid process on a continuous basis by means of a rotating filtration unit having a plurality of sector shaped, tilting filter pans arranged as a horizontal disk. For one of the earliest examples of such a filtration unit, see U.S. Pat. No. 938,378 to Grothe et al. For various improvements on the basic unit, see, for example, U.S. Pat. No. 3,080,063 to Kyrynski et al, U.S. Pat. No. 3,426,909 to Garner and U.S. Pat. No. 4,721,566 to Chamberlain. In these tilting pan filtration units, each pan consists of a filtration grid and a filter cloth supported on a surface of the grid. It includes a means to enable the pan to rotate about a radial axis of the disk into an inverted position.

In operation, the filter pans are continuously rotated about a vertical axis of the disk so that each filter pan progressively passes through various stations. At one station, a pan receives a charge of slurry. When the pan has been filled, partial vacuum is applied to the underside of the filter to assist in drawing the phosphoric acid through the filter. At a subsequent station, the filter pan is rotated and inverted to empty the solids from the filter. At yet a later station, water is sprayed upwardly into the inverted filter pan to clean the pan. The pan is then dried and ready to receive the next charge of slurry. In addition to the above stations and steps, it is known to provide other stations or steps as well. For example, positive pressure may be applied instead of vacuum during the inverting or washing steps to assist in dislodging the solids from the filter.

Various filter pans are known for use in the above type of filtration units, some of which include a filtration grid surface having a plurality of parallel channels or grooves. In these pans, the crests of the channels combine to support a filter and the bottoms of the channels allow for increased flow of the filtrate toward a collection point. See, for example, U.S. Pat. No. 3,216,576 to Roos. In this patent, a rubber mat rests on top of a metal bottom of the filter pan, which rubber mat includes alternating deep and narrow grooves. A problem with this filter pan is that the rubber mat is not durable and, thus, requires frequent replacement.

Another filter pan having a plurality of parallel flow channels is disclosed in U.S. Pat. No. 3,426,909 to Garner. In this patent, strips of sheet metal are formed by cold rolling, and then a large number of the formed strips are welded together to form a filtration plate. The flow channels are wider at the bottom than the top, which makes it difficult to adequately clean the channels. Further, since the welds are located along the length of each channel, it cannot provide adequate sealing. And exposed to acids, over time, the welds tend to corrode and weaken, resulting in pan warpage and decreased life.

A more general problem with metal filter pans is that of scale build-up. More specifically, scale build-up can occur during at least two stages of the process. First, during filtering of the slurry, the pan looses heat, quickly causing the filtrate to cool from contact with the pan. Second, when the filter pan is washed by relatively cool wash water, the pan surface cools rapidly. Both of these events accelerate scale formation in the pan. In view of these limitations, a filter pan which is easy to clean, durable, and resists scale build-up, would be a significant advancement in the filter pan art.

SUMMARY OF THE INVENTION

The present invention provides an improved filtration grid or plate for use in a filter pan. Such a filtration grid comprises a corrugated sheet having a series of alternately upwardly and downwardly opening channels. A reinforcing insulating material is bonded to the underside surfaces of the channels. This reinforcing material is effective for strengthening the sheet and retaining heat in a manner effective to slow cooling of the filtration grid during washing, and to reduce heat losses from the filtration grid during filtering. According to a preferred aspect of the invention, the filtration grid is a monolithic sheet of a structural metal such as steel having a smooth upper filtration surface, and reinforcing material. For phosphoric acid production the metal would be stainless steel and the sulfuric acid resistant plastic would be structurally stable at temperatures up to about 88° C.

The present invention also provides a filter pan configured for use in filtration of a filtrate from solid particles. The filter pan comprises a filtration grid in the form of a corrugated, monolithic sheet of structural metal having a series of alternately upwardly and downwardly opening channels. The filtration grid has an upper filtration surface that is smooth and unbroken by welds or joints, and the upwardly opening channels thereof have a width effective for channeling liquid and reducing pooling. A filter cloth is disposed on the upper filtration surface of the filter pan grid. All acid collected inside the grid channels flows towards a drain having openings therein, preferably a center collection trough. A frame supports the filtration grid, filter cloth, and collection trough, so that the entire assembly can for example be filled, emptied, cleaned and refilled in the same manner as conventional filter pans. Suitable means are provided for releasibly securing the filter on the frame. The collection trough of the filter pan preferably includes a perforated plate extending in a lengthwise direction of the pan. A pair of filtration grids may be disposed on opposite sides of the perforated plate with the upwardly opening channels of each grid extending in a widthwise direction of the filter pan. A collection system may be disposed beneath the drain for collecting filtrate and feeding it to an outlet pipe.

According to a further aspect of the invention, the filter pan may have a filtration grid comprising a sheet of structural metal having a reinforcing material bonded to a lower surface thereof, which reinforcing material is effective for strengthening the sheet and retaining heat in a manner effective to slow cooling of the filtration grid during washing. The grid may be uncorrugated, e.g. flat or inclined towards the drain, or may have upwardly opening grooves but no downwardly opening grooves.

The invention also provides a method for fabricating a filtration grid for use in a filter pan. A sheet of a structural metal is first stamped to form it into a corrugated sheet having a series of alternately upwardly and downwardly opening channels. The reinforcing material is then bonded to surfaces of the downwardly opening channels in a manner effective for strengthening the sheet and retaining heat in a manner effective to slow cooling of the filtration grid during washing. The reinforcing material is preferably a curable plastic such that the downwardly opening channels are coated or filled with the plastic in an uncured state, and the plastic is then cured.

Other objects, features and advantages of the invention will become apparent from the following detailed description. It should be understood, however, that the detailed description is given by way of illustration only, since various changes and modifications within the spirit and scope of the invention will become apparent to those skilled in the art from this detailed description.

BRIEF DESCRIPTION OF THE DRAWINGS

The invention will be further described with reference to the accompanying drawings, wherein like numerals denote like elements:

FIG. 2 is a longitudinal sectional view of the filter pan of FIG. 1 taken along line 2—2;

FIG. 3 is a cross-sectional view of the filter pan of FIG. 2 taken along line 3—3;

DETAILED DESCRIPTION OF PREFERRED EMBODIMENTS

Figure 7:
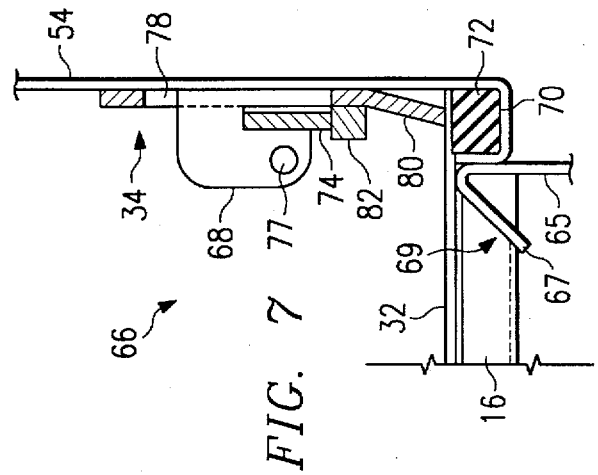
FIG. 7 is an enlarged side sectional view of a filter hold-down device according to the invention, with the filter shown.
Figure 9A:
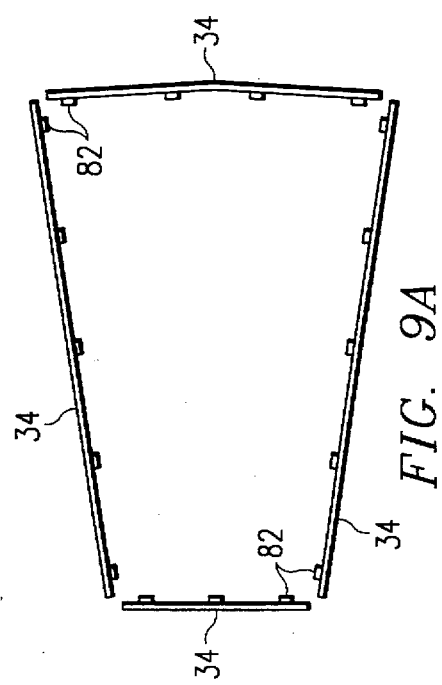
FIG. 9A is an top plan view of clamps for use with the hold-down device in accordance with the invention.
Figure 8:
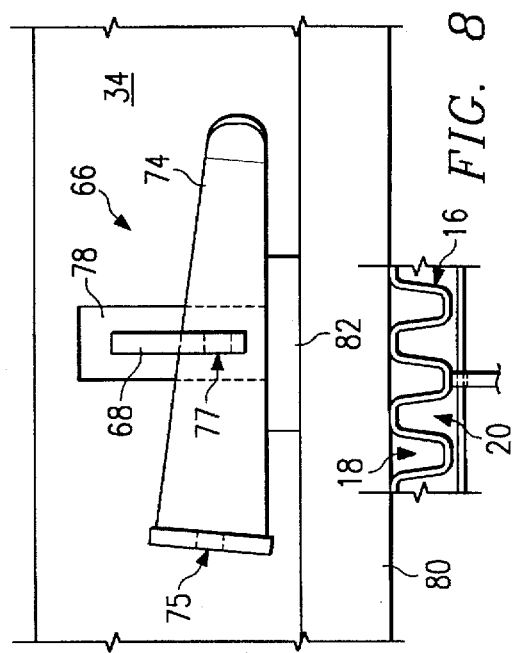
FIG. 8 is an enlarged front elevation view of the filter hold-down device.

Referring to the Figures, a filter pan 10 according to the invention includes, as main components, a dump side filtration plate or grid 12, a lip side filtration plate or grid 14, a drainage trough 28, a frame assembly 30 comprising a slurry retainment frame 50 and a grid supporting frame 60, a filter cloth 32 (see FIG. 7), and a number of filter locking devices 66. Unless otherwise specified, the various metal elements of filter pan 10 are secured together in a known manner, such as by welding.

Figure 1:
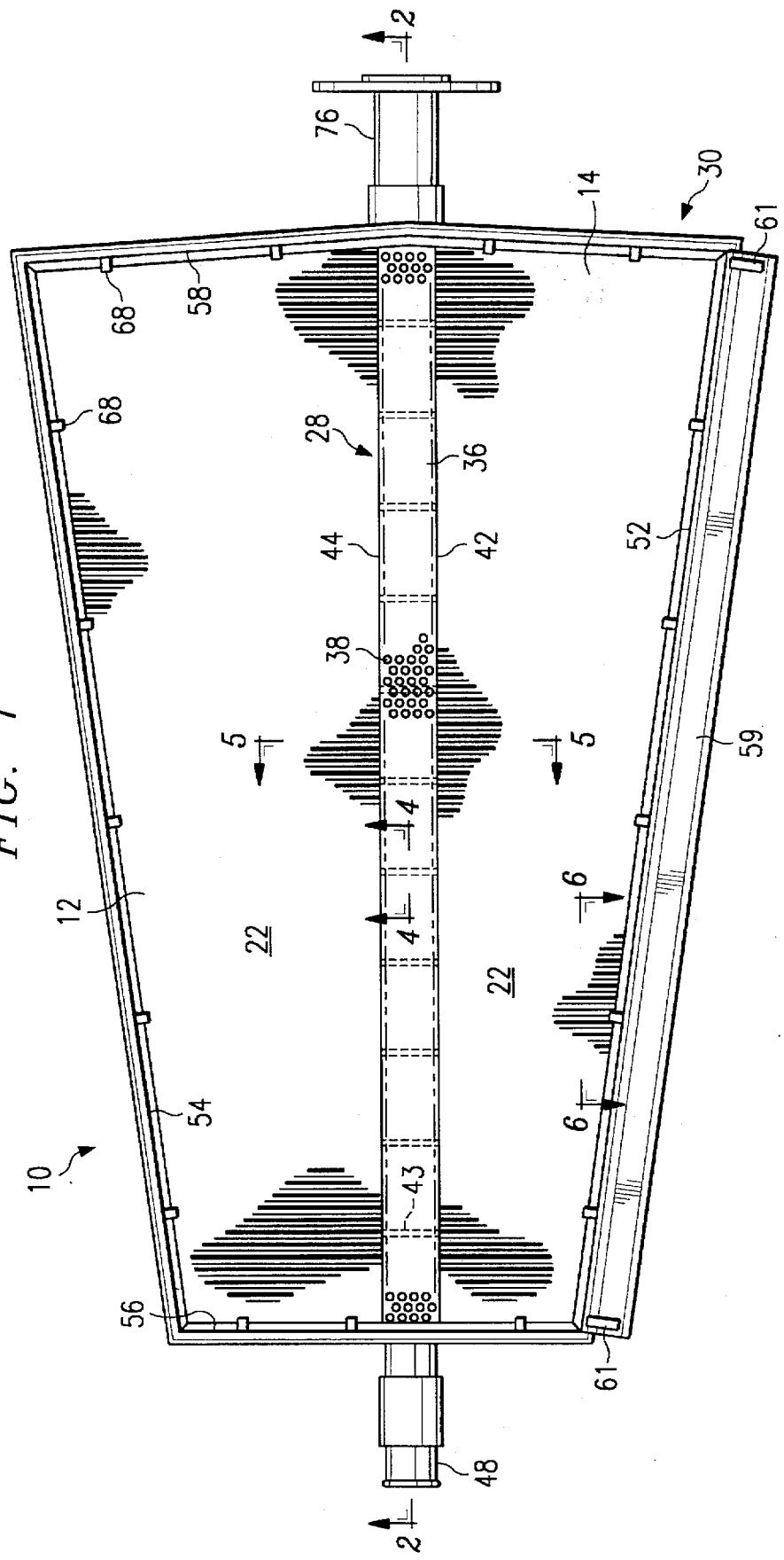
FIG. 1 is a top plan view, partially broken away, of a tilting filter pan according to the invention with the filter removed.

As shown in FIG. 1, dump side grid 12 has a greater surface area than lip side grid 14. Accordingly, filter pan 10 is configured to receive more slurry on dump side filtration grid 12 than on lip side filtration grid 14, resulting in a gravitational assist for dumping the filter cake from pan 10. Other than for this difference, however, the pair of grids 12, 14 are similar to one another. Thus, although only lip side grid 14 is described in detail below, the description thereof applies equally to dump side grid 12.

Figure 6:
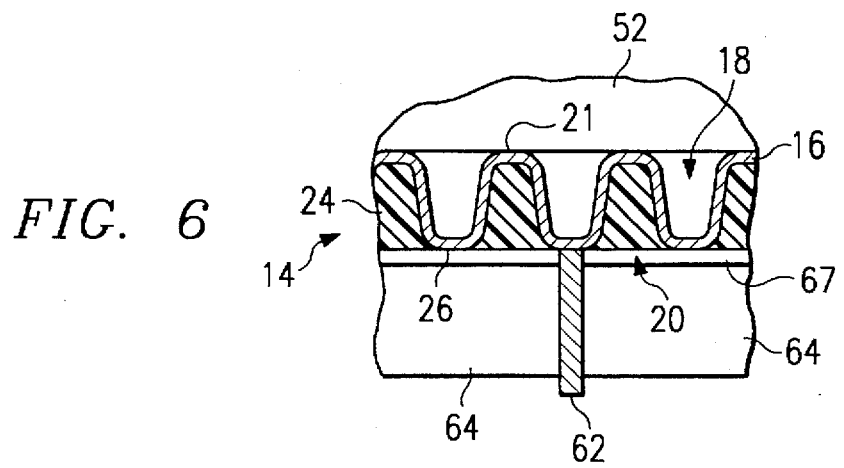
FIG. 6 is an enlarged fragmentary sectional view of the corrugated sheet of the filter pan of FIG. 1 taken along line 6—6.
Figure 9B:
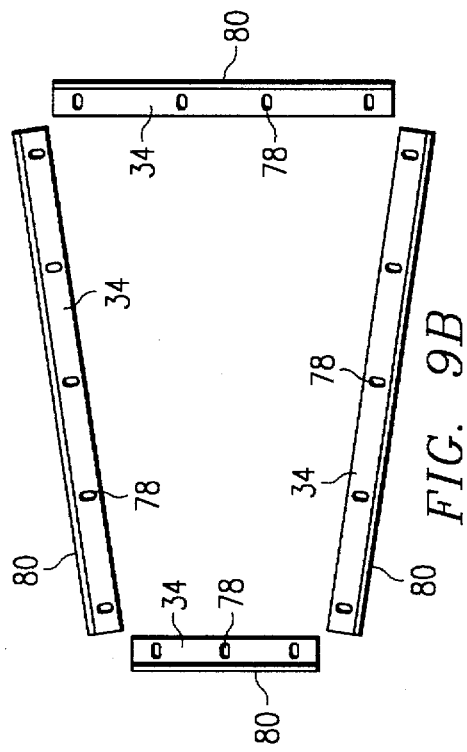
FIG. 9B is a top plan view of the clamps shown in FIG. 9A with each clamp rotated 90° to show the outer surface of each clamp.

Referring now to FIGS. 1 and 6, lip side filtration grid 14 comprises a corrugated, generally rigid steel sheet 16 having a series of alternately upwardly opening channels 18 and downwardly opening channels 20. Upwardly opening channels 18 have a width effective for channeling liquid. Preferably, corrugated sheet 16 is a monolithic sheet made of a structural metal having an upper filtration surface 22 that is smooth and unbroken by welds or joints. The smooth and unbroken upper surface allows for increased instantaneous production rates, increased on-stream factor, and a lower acid dilution. For purposes of the present invention, the term "structural metal" refers to metals such as irons, steels and aluminum alloys commonly used for fabricating machine parts and suitable for fabrication by stamping.

Referring now to FIGS. 1–5, drain 28 is positioned lengthwise between the pair of filtration grids 12 and 14, and comprises a perforated plate 36 preferably running the entire length of filtration grids 12, 14. Perforated plate 36 has an upper surface 37 generally flush with a plane defined by upper crests 21 of upper filtration surface 22, and includes a plurality of openings 38 for communicating filtrate from grids 12, 14 to a collection system 40.

Figure 4:
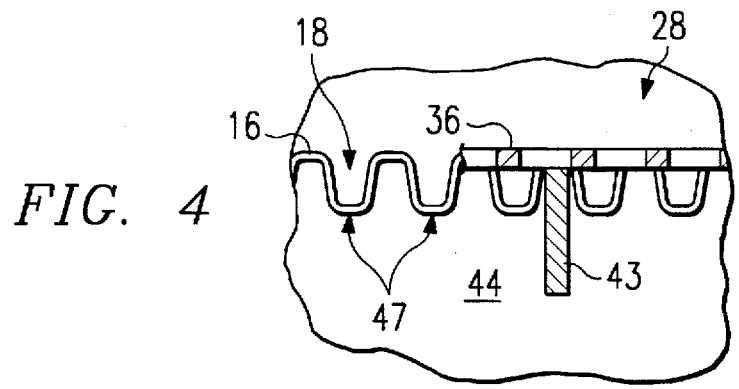
FIG. 4 is a enlarged fragmentary side sectional view of the drain of the filter pan of FIG. 1 taken along line 4—4.
Figure 5:
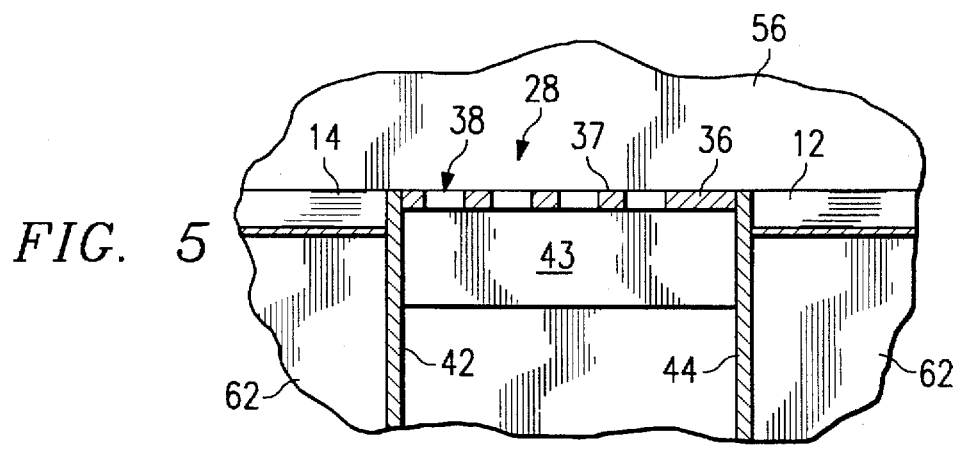
FIG. 5 is an enlarged fragmentary cross-sectional view of the drain of the filter pan of FIG. 1 taken along line 5—5.

Collection system 40 comprises a pair of trough sides 42, 44, a plurality of trough spacer bars 43, an inclined trough bottom 45, and a cover 46. Trough sides 42, 44 depend downwardly from filtration grids 14, 12, respectively, and as shown in FIG. 4, each trough side 42, 44 includes a plurality of notches 47 aligned with upwardly opening channels 18 of corrugated sheet 16 for allowing passage of filtrate therefrom to collection system 40. Trough spacer bars 43 are used to support perforated plate 36 and, along with trough cover 46, maintain the spacing of filtration grids 12 and 14. As best shown in FIG. 2, trough bottom 45 is positioned between drain 28 and trough cover 46 with a generally downward slope for communicating filtrate from drain 28 to an outlet end pipe 48. Although not a part of collection system 40, a tilt end journal 76 preferably extends from collection system 40 opposite outlet end pipe 48 for connection to a means for inverting pan 10. Suction and/or blown air is applied to the filtration grids 12, 14 through end pipe 48 in manner known in the art.

Referring now to FIGS. 1 and 3, slurry retainment frame 50 includes a blade side panel 52, a dump side panel 54, an outlet end panel 56 and a tilt end panel 58. Blade side panel 52 includes a normally horizontal blade 59 configured to extend over the dump side panel of an adjacent pan (not shown) when receiving a charge of slurry. Further, blade side panel 52 includes a pair of vertical splash guards 57 at opposite ends thereof for helping to contain slurry within retainment frame 50.

FIGS. 7, 8, 9A and 9B show various elements of filter locking devices 66 used to secure filter 32 to filter pan 10. In particular, each locking device 66 comprises a caulking wedge ear 68 in a spaced arrangement along each of panels 52, 54, 56 and 58, a rubber bottom strip 72 preferably extending around the entire outer perimeter of upper filtration surface 22 fitting in a groove 70 formed along a bottom edge of panels 52, 54, 56 and 58, a plurality of caulking clamps 34, and a plurality of caulking wedges 74. There is preferably one caulking clamp 34 corresponding to each panel 52, 54, 56 and 58, which are identical except for their lengths. Caulking clamps 34 include a plurality of spaced slots 78 configured and spaced to allow passage of ears 68 therethrough, an angled portion 80 for pressing filter 32 into rubber strip 72, and an inwardly directed lug 82 for receiving downward bias pressure. For installation, best seen in FIG. 7, filter 32 is first placed over rubber strip 72, then caulking clamps 34 are installed over caulking wedge ears 68 and, finally, caulking wedges 74 are slid between ears 68 and lugs 82 to bias clamp 34 downwardly and hold filter 32 in place. Optionally, wedges 74 may be secured in place by a nylon cable tie extending through a hole 75 in wedge 74 and through a hole 77 in ear 68. Filter 32 may be made of any material known in the art but, preferably, is a cloth material such as 15 mil polyethylene.

Figure 10:
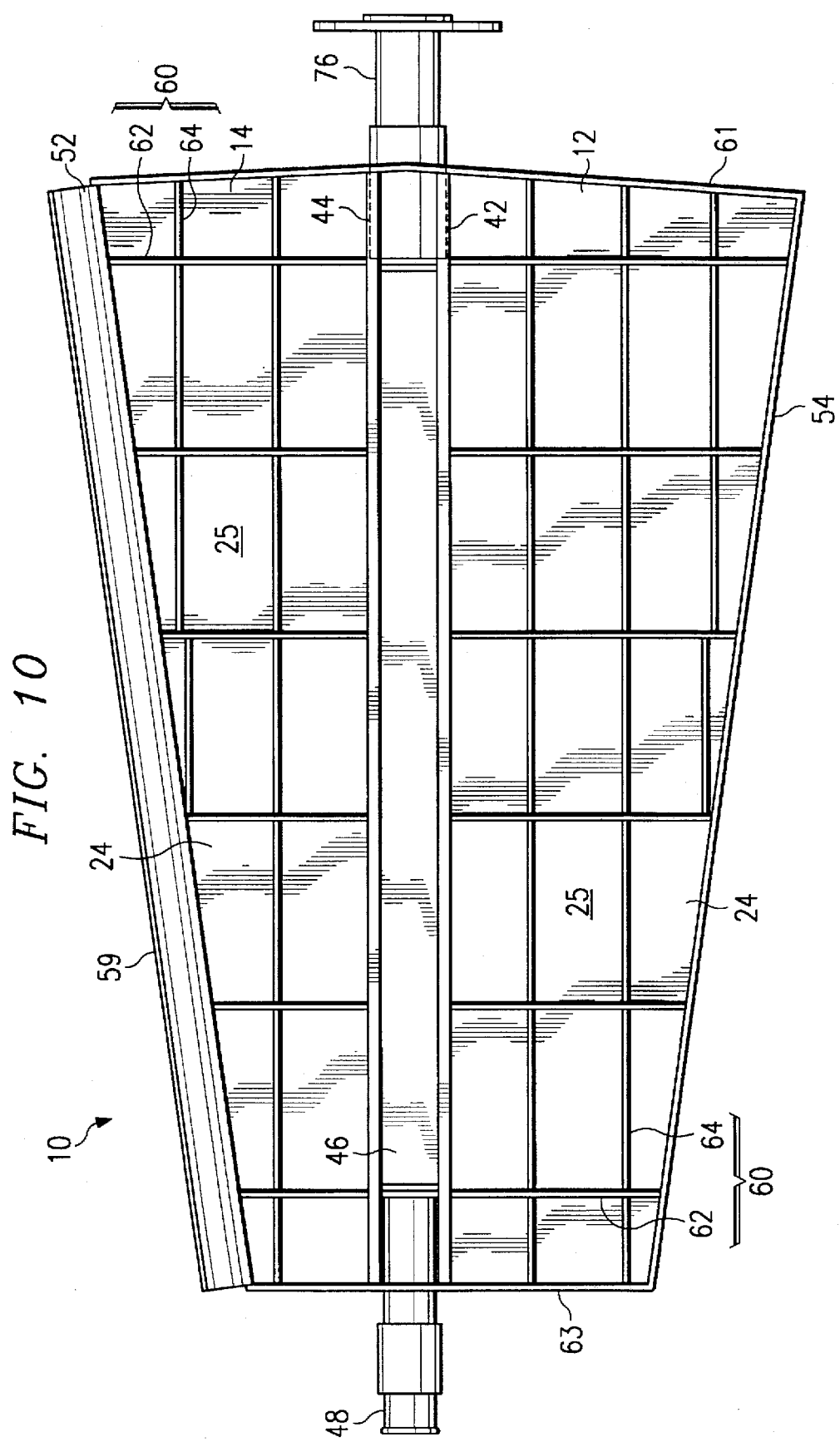
FIG. 10 is a bottom plan view of the filter pan according to the invention.

Referring now to FIG. 10, grid supporting frame 60 comprises a plurality of equally spaced grid support plates 62 extending in a widthwise direction of filter pan 10 and a plurality of grid support beams 64 extending in a lengthwise direction of pan 10 and spanning support plates 62. In this manner, grid support plates 62 and grid support beams 64 form an open grid support structure on the underside of filtration grids 12, 14. Grid supporting frame 60 further includes a tilt end journal plate 61 adjacent tilt end journal 76, an outlet end journal plate 63 adjacent outlet end pipe 48, and a grid edge seal strip 65 that extends around the periphery of grids 12 and 14. Grid edge seal strip 65 provides a surface for securing supporting frame 60 to retainment frame 50 for forming frame assembly 30, and optionally includes a downturned edge 67 on its two long sides for forming an upwardly sloping end 69 in each upwardly opening channel 18 (see FIG. 6). When optional downturned edge 67 is used, it is preferable to saw cut the edge of corrugated sheet 16 to a complementary angle to form end 69.

Referring now to FIG. 6, filtration grid 14 preferably includes a reinforcing material 24 bonded to surfaces of downwardly opening channels 20 to provide grid 14 with the desired structural strength, heat holding capacity and insulating properties. Reinforcing material 24 may coat the underside of corrugated sheet 16 as a uniform layer of the material or, preferably, completely fill downwardly opening channels 20 in grid 14 and leave a thin layer 26 of material 24 over the undersurface of corrugated sheet 16 between downwardly opening channels 20, thus creating a generally flat bottom 25. The thickness of thin layer 26 will vary depending on the material used, but for the preferred material discussed below, it is between about 4–6 millimeters thick between downwardly opening channels 20.

Application of material 24 to underside of filtration grid 14 reduces scale build-up on upper filtration surface 22 allowing surface 22 to remain cleaner longer. Such build-up occurs when the pan is suddenly chilled by a rinse with wash water, causing minerals to precipitate on the pan surface. Material 24 effectively retains heat in a manner effective to slow cooling of filtration grid 14 during this washing. Further, material 24 reduces radiation heat losses of filtration grid 14 during filtering by providing an insulating layer.

For purposes of phosphoric acid filtration, reinforcing material 24 must be phosphoric and sulfuric acid-resistant and maintain its structural stability at temperatures to about 88° C., the temperature at which phosphoric acid filtration operations are commonly carried out. In a preferred embodiment, reinforcing material 24 is a high performance curable plastic such as an epoxy, particularly a multi-functional polyamide epoxy with a modified aliphatic/cycloaliphatic amine hardener. In the alternative, other thermoplastic or thermosetting materials may be used. For example, reinforcing material 24 could be an inorganic material such as a hardenable ceramic, but such materials would unduly increase the weight of filter pan 10 and are therefore not preferred. Using the preferred epoxy reinforcing material, the overall pan weight is reduced by 10% from the same pan without the reinforcing material, but relying on thicker corrugation for an equivalent strength. This increase in strength allows less structural material to be used during fabrication, and the decrease in weight results in less maintenance and wear and tear on the pan and filter frame.

The invention also provides a method for making filtration grid 14 comprising stamping a sheet of a structural metal to form it into corrugated sheet 16 having alternately upwardly opening channels 18 and downwardly opening channels 20, and bonding reinforcing material 24 to surfaces of downwardly opening channels 20. The underside of filtration grid 14 is preferably sandblasted prior to applying reinforcing material 24, for improving adherence of material 24 to grid 14. Preferably, about 4 mils of metal of grid 14 is sandblasted using, for example, 36 grit size aluminum oxide.

Upwardly opening channels 18 have a width effective for channeling a filtrate and reinforcing material 24 is effective for strengthening sheet 16, retaining heat in a manner effective to slow cooling of filtration grid 14 during washing, and reducing radiation of heat from filtration grid 14 during acid application. Preferably, reinforcing material 24 is a curable plastic and the method further includes coating downwardly opening channels 20 with the plastic in an uncured state, and then curing the plastic. Even more preferably, the method comprises completely filling the downwardly opening channels with the reinforcing material. When grid 14 is to be incorporated into pan 10, the reinforcing material is preferably bonded to the downwardly opening channels after grid 14 has been secured within frame 30, such as by welding to underlying frame 60 prior to coating with the reinforcing material.

According to the invention, filtration grid 14 can be made by stamping or die pressing a flat sheet of the structural metal in a manner effective to form it into a corrugated sheet preferably having a thickness in the range of from 78 to 109 mm from the standpoints of cost, weight and strength. A 78 mm thick 317L stainless steel sheet may be effectively corrugated using a 400 ton press. The stamped sheet is, if necessary, cut to the desired peripheral shape, and the underside is then filled in with the reinforcing material, which is then cured.

It will be understood that the foregoing description is of preferred exemplary embodiments of the invention, and that the invention is not limited to the specific forms shown. For example, These and other modifications may be made in the design and arrangement of the elements without departing from the scope of the invention as expressed in the appended claims.

We claim:

1. A filtration plate for use in a filter pan, comprising a corrugated sheet having a series of alternately upwardly and downwardly opening, elongated channels, the upwardly opening channels having a width and configuration effective for channeling a flow of filtrate along an upper filtration surface of the plate in a lengthwise direction of the upwardly opening channels, the flow of filtrate moving in a direction parallel to the plate, and a reinforcing material bonded to surfaces of the downwardly opening channels, which reinforcing material is effective for strengthening the sheet and retaining heat in a manner effective to slow cooling of the filtration plate during filtrate addition and washing.

2. The filtration plate of claim 1, wherein the corrugated sheet is an imperforate, monolithic sheet of structural metal having a smooth upper filtration surface.

3. The filtration plate of claim 1, wherein the corrugated sheet is made of a structural metal, and the reinforcing material comprises a phosphoric and sulfuric acid-resistant plastic structurally stable at temperatures up to about 88° C.

4. The filtration plate of claim 2, wherein the corrugated sheet has a thickness in the range of from 78 to 109 mm, and the reinforcing material comprises a phosphoric and sulfuric acid-resistant plastic material structurally stable at temperatures up to about 88° C.

5. The filtration plate of claim 3, wherein the reinforcing material fills the downwardly opening channels.

6. The filtration plate of claim 4, wherein a thin layer of the reinforcing material extends over an undersurface of the corrugated sheet between the downwardly opening channels and forms a flat lower surface on the filtration plate.

7. The filtration plate of claim 2, wherein the upwardly opening channels have a generally rectangular shape with rounded corners.

8. A filter pan configured for use in filtration of a filtrate from solid particles, comprising:

a filtration plate comprising a corrugated, imperforate monolithic sheet of structural metal having a series of alternately upwardly and downwardly opening, elongated channels, the upwardly opening channels having a width and configuration effective for channeling a flow of filtrate along an upper filtration surface of the plate in a lengthwise direction of the upwardly opening channels, the flow of filtrate moving in a direction parallel to the plate, wherein the upper filtration surface including the upwardly opening channels is smooth and unbroken by welds or joints;

a filter disposed on the upper filtration surface of the filtration plate;

a drain having openings therein positioned to collect filtrate flowing along the upwardly opening channels on the filtration plate;

a frame that supports the filtration plate, filter, and drain; and a mechanism for releasably securing the filter on the frame.

9. The filter pan of claim 8, wherein the filtration plate has a reinforcing material bonded to surfaces of the downwardly opening channels, which reinforcing material is effective for strengthening the sheet and retaining heat in a manner effective to slow cooling of the filtration plate during washing.

10. The filter pan of claim 8, wherein the drain comprises a perforated plate extending in a lengthwise direction of the pan, and a pair of the filtration plates are disposed on opposite sides of the perforated plate with the upwardly opening channels of each plate extending in a widthwise direction of the filter pan.

11. The filter pan of claim 8, further comprising a collection system disposed beneath the drain for collecting filtrate and feeding it to an outlet pipe.

12. The filter pan of claim 9, wherein the reinforcing material comprises a phosphoric and sulfuric acid-resistant plastic structurally stable at a temperature of about 88° C.

13. The filter pan of claim 12, wherein the corrugated sheet has a thickness in the range of from 78 to 109 mm.

14. The filter pan of claim 12, wherein the reinforcing material fills the downwardly opening channels.

15. The filter pan of claim 14, wherein a thin layer of the reinforcing material extends over an undersurface of the corrugated sheet between the downwardly opening channels and forms a flat lower surface on the filtration plate.

16. A filter pan configured for use in filtration of a filtrate from solid particles, comprising:

a filtration plate comprising an imperforate sheet of structural metal having a series of upwardly opening, elongated channels, the upwardly opening channels having a width and configuration effective for channeling a flow of filtrate along an upper filtration surface of the plate in a lengthwise direction of the upwardly opening channels, the flow of filtrate moving in a direction parallel to the plate, and having a reinforcing material bonded to a lower surface thereof, which reinforcing material is effective for strengthening the sheet and retaining heat in a manner effective to slow cooling of the filtration plate during filtrate addition and washing;

a filter disposed on the upper filtration surface of the filtration plate;

a drain having openings therein positioned to collect filtrate flowing along the upwardly opening channels on the filtration plate;

a frame that supports the filtration plate, filter, and drain; and a mechanism for releasably securing the filter on the frame.

17. The filter pan of claim 16, wherein the reinforcing material comprises a phosphoric and sulfuric acid-resistant plastic structurally stable at temperatures up to about 88° C.

18. A method for making a filtration plate for use in a filter pan, comprising the steps of:

stamping a sheet of a structural metal to form it into a corrugated sheet having a series of alternately upwardly and downwardly opening, elongated channels, the upwardly opening channels having a width and configuration effective for channeling a flow of filtrate along an upper filtration surface of the plate in a lengthwise direction of the upwardly opening channels, the flow of filtrate moving in a direction parallel to the plate; and bonding a reinforcing material to surfaces of the downwardly opening channels, which reinforcing material is effective for strengthening the sheet and retaining heat in a manner effective to slow cooling of the filtration plate during filtrate addition and washing.

19. The method of claim 18, wherein the reinforcing material comprises a phosphoric and sulfuric acid-resistant plastic structurally stable at a temperature of about 82° C., and the filtration plate comprises a corrugated, imperforate monolithic sheet of structural metal having a series of alternately upwardly and downwardly opening, elongated channels, the upwardly opening channels having a width and configuration effective for channeling a flow of filtrate along an upper filtration surface of the plate in a lengthwise direction of the upwardly opening channels, the flow of filtrate moving in a direction parallel to the plate.

20. The method of claim 19, wherein the plastic is a curable plastic, further comprising coating the downwardly opening channels with the plastic in an uncured state, and then curing the plastic.

21. The method of claim 20, further comprising filling the downwardly opening channels with the reinforcing material.

* * * * *